United States Patent [19]

Zendle

[11] Patent Number: 4,546,259
[45] Date of Patent: Oct. 8, 1985

[54] THERMOLUMINESCENCE DOSIMETER

[75] Inventor: Robert Zendle, Schenectady, N.Y.

[73] Assignee: The United States of America as represented by the United States Department of Energy, Washington, D.C.

[21] Appl. No.: 548,278

[22] Filed: Nov. 3, 1983

[51] Int. Cl.⁴ .............................................. G01T 1/11
[52] U.S. Cl. .................................. 250/484.1; 250/337
[58] Field of Search ............................ 250/337, 484.1

[56] References Cited

U.S. PATENT DOCUMENTS 3,735,134  5/1973  Lucas .................................. 250/337
4,039,834  8/1977  Lucas et al. ......................... 250/337

Primary Examiner—Alfred E. Smith
Assistant Examiner—Carolyn E. Fields
Attorney, Agent, or Firm—Judson R. Hightower

[57] ABSTRACT

A thermoluminescence dosimeter having a very small rate of decline of sensitivity during subsequent uses after heating is disclosed. The dosimeter includes a detector crystal and a glass enclosure in which the detector crystal is located. The glass enclosure is air tight and is filled with a super dry inert fill gas. The inert fill gas is nonreactive with the detector crystal when the detector crystal is heated to thermoluminescence. The fill gas is selected from the group consisting of air, nitrogen, and argon, suitable admixed with 5 to 25 percent helium. The detector crystal consists essentially of calcium fluoride. The fill gas is preferably contained at a subatmospheric pressure in the glass enclosure.

4 Claims, 4 Drawing Figures

THERMOLUMINESCENCE DOSIMETER

FIELD OF THE INVENTION

The present invention relates generally to an exposure meter for gamma radiation and more particularly to a reuseable thermoluminescence dosimeter having a very small rate of decline of sensitivity during subsequent uses.

BACKGROUND OF THE INVENTION

In order to measure radiation exposure of personnel or environmental areas, a thermoluminescence dosimeter is frequently carried by the personnel or stationed in the area to measure accumulated radiation dosage. The dosimeter contains a crystalline material that traps some of the electrons released during exposure to radiation.

Frequently, the detector element in a thermoluminescence dosimeter is a small chip of white, crystalline calcium fluoride. This material has the property of giving off light in proportion to the accumulated ionizing effects (or dose) of radiation incident thereon. Light is emitted when the calcium fluoride is heated to approximately 300° C. The quantity or peak intensity of the light emission ("thermoluminescence") is directly proportional to the radiation dose accumulated since the last heating cycle ("readout").

By continuing heating to approximately 600°, most of the electrons caught in the higher energy traps in the crystal are "baked out" to minimize their subsequent escape to lower energy traps. This results in a stable "zero" condition when the detector element is subsequently cooled to room temperature. This zero condition continues until ionizing radiation exposure in the crystal dislocates electrons which are trapped in the crystal. The dislocated electrons accumulate until released during a subsequent heating cycle wherein light is again emitted as the electrons return to the normal energy level.

It has been observed from periodic thermoluminescence dosimeter recalibration data and special testing that the thermoluminescence dosimeter readings for the same exposure decrease exponentially as a function of the number of times a thermoluminescence dosimeter is used. Thus, the reuseability of a thermoluminescence dosimeter is defined as the number of times the dosimeter can be used (i.e., the number of readouts) before its light output reading declines by more than 15% from the standard for the same exposure. Although presently available commercial units maintain the required sensitivity for 300 use cycles, the potential for a 15% error in sensitivity, in addition to other experimental and statistical errors inherent in the use of the units, is considered undesirable.

The use of a calcium fluoride detector element in a thermoluminescence dosimeter is disclosed in U.S. Pat. No. 4,039,834 (Lucas et al). According to the specification in this patent, the calcium fluoride material is relatively stable in humid air so that the manner in which the detector chip is mounted or encapsulated is not critical. It is suggested in this patent that optimally, the chip should be encapsulated in a sealed enclosure containing an inert gas such as nitrogen or argon.

Other patents of general interest, which disclose various forms of dosimeters, include the following: U.S. Pat. Nos. 3,371,209 (Rutland et al); 3,789,227 (Eichner et al); 4,224,519 (Gammage); and 4,105,918 (Miyagawa et al). The first three patents disclose the use of calcium fluoride as a detector element and the last patent discloses the use of calcium sulfate.

SUMMARY OF THE INVENTION

In accordance with the present invention, a thermoluminescence dosimeter is provided having a detector crystal consisting essentially of calcium fluoride and a glass enclosure in which the detector crystal is located. The glass enclosure is air tight and is filled with a super dry inert gas. This inert gas is substantially nonreactive with the detector crystal when the detector crystal is heated to thermoluminescence so that the rate of decline of sensitivity of the detector crystal during subsequent uses is substantially lessened.

The fill gas is either air, nitrogen, or argon which is admixed with 5 to 25 mole percent helium. Preferably, the fill gas is admixed with helium and the relative water vapor content is less than 0.30 mole percent. The fill gas is also preferably contained at a subatmospheric pressure in the glass enclosure.

Other features and advantages of the present invention are stated in, or apparent from, the detailed description of a presently preferred embodiment of the invention found hereinbelow.

DETAILED EMBODIMENT OF THE PREFERRED EMBODIMENT

Figure 1:
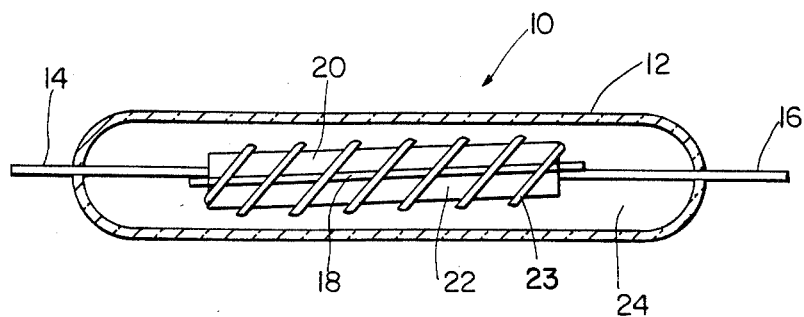
FIG. 1 is cross-sectional elevation view of a thermoluminescence dosimeter according to the present invention.

With reference now to FIG. 1, a thermoluminescence dosimeter 10 is depicted. Dosimeter 10 includes an air tight glass enclosure 12 having a generally cylindrical shape with rounded ends. Extending through the ends of glass enclosure 12 are electrodes 14 and 16. Inside of glass enclosure 12, the ends of electrodes 14 and 16 are attached to the adjacent ends of a heater strip 18. Located on either side of heater strip 18 are detector elements 20 and 22 which comprise small chips of white, crystalline calcium fluoride doped with Mn. In order to clamp detector elements 20 and 22 to heater strip 18, a coiled spring 23 is located about detector elements 20 and 22 as shown. Contained in glass enclosure 12 and surrounding detector elements 20 and 22 is a fill gas 24.

As explained previously, dosimeter 10 is used to measure radiation exposure. When detector elements 20 and 22 are exposed to ionizing radiation, electrons are dislocated in the crystal and are raised above their normal energy level. Subsequently, when it is desired to determine how much radiation dosimeter 10 has been exposed to, electrodes 14 and 16 are attached to a suitable current source. By passing current through electrodes 14 and 16, heater strip 18 is quickly heated. In this manner, detector elements 20 and 22 are similarly heated. Detector elements 20 and 22 have the property that the light output is a function of the exposure to ionizing radiation. Thus, by measuring the maximum intensity of the "glow peak" of the detector elements 20 and 22 as the elements are heated to 300° C. in ten seconds, the exposure to ionizing radiation can be determined.

By continuing to heat detector elements 20 and 22 to a temperature of about 600° C. after the glow peak is determined, most of the electrons which were caught in the higher energy traps in the detector elements are "baked out" to minimize their subsequent escape to lower energy traps. This results in a stable "zero" condition of the detector elements 20 and 22 which is maintained until detector elements 20 and 22 are again exposed to ionizing radiation.

Because the detector elements 20 and 22 can be returned to a zero condition, it is possible to reuse dosimeter 10 for a large number of measurements. However, some degradation of detector elements 20 and 22 occurs with each use cycle. The degradation is evident in the surface discoloration and darkening of the detector elements. This degradation causes the light output reading of detector elements 20 and 22 to decrease slightly with each cycle so that the same exposure will eventually not produce the same glow peak or indication of exposure. As a convenient measure, the "reuseability" of dosimeter 10 is defined as the number of times dosimeter 10 can be reused (i.e., read out and recycled) before the light output reading declines by more than 15% from the standard for the same exposure.

In order to substantially lessen the rate of decline of sensitivity, and thus significantly increase the number of use cycles, the fill gas 24 in dosimeter 10 consists of an admixture of air and 5 to 25% helium. This admixed fill gas 24 is also super dry, having, for example, a relative water vapor concentration of less than 0.3 mole percent. In other embodiments of the present invention, air is replaced by either argon or nitrogen.

Figure 2:
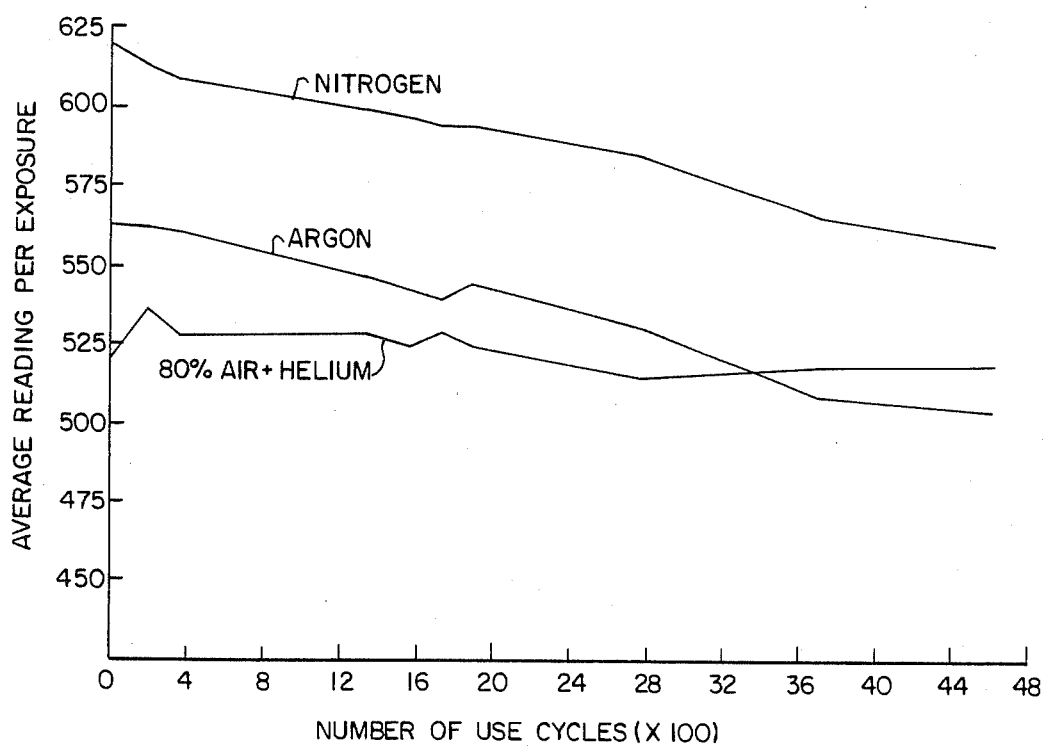
FIG. 2 illustrates the rate of decline of the average reading of a thermoluminescence dosimeter filled with various gases over a number of use cycles.
Figure 3:
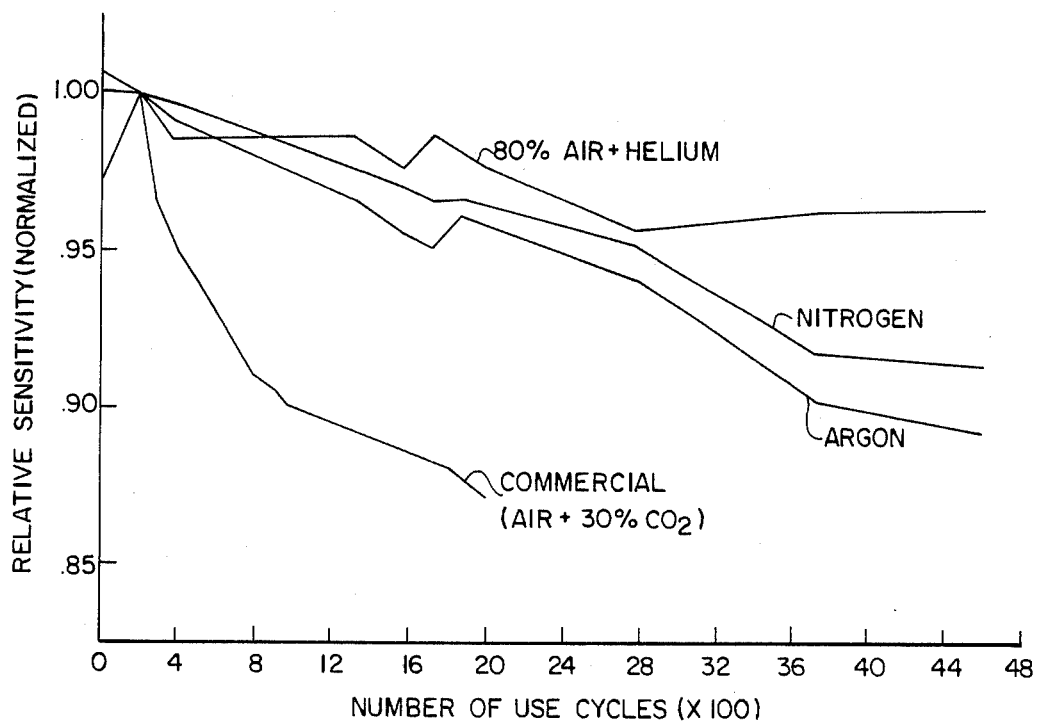
FIG. 3 illustrates the relative sensitivity of a thermoluminescence dosimeter filled with various gases over a number of use cycles.
Figure 4:
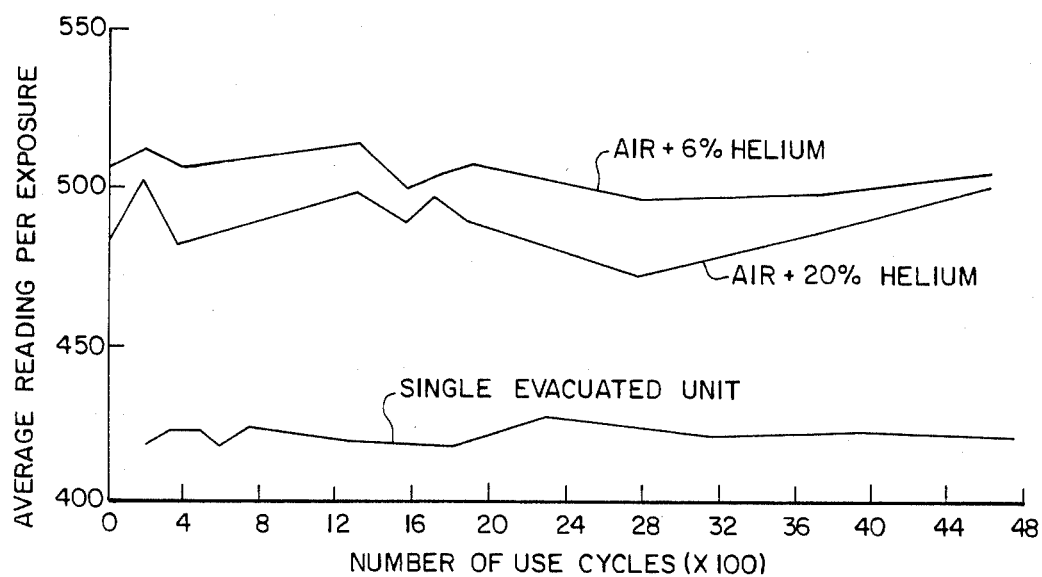
FIG. 4 shows the average reading of a dosimeter filled with various gases over a number of use cycles compared to an evacuated thermoluminescence dosimeter.

In experiments performed using the device of the present invention, dosimeters having a super dry fill gas containing an admixture of air and helium were compared with dosimeters having a special fill gas of argon, nitrogen, and helium as well as to a commercial dosimeter of the same lot with no changes made to provide a special fill gas. The results of these experiments are shown in FIGS. 2, 3 and 4.

It should be noted that the commercially produced dosimeters were expected to have a fill gas corresponding substantially to that of ambient air. However, it was found that the fill gas contained high concentrations of $CO_2$ (greater than 28 mole percent) and water vapor. The concentration of nitrogen and oxygen were correspondingly approximately 20 and 10 mole percent below normal, respectively. While the reason for the variance in the content of the fill gas in a commercially produced dosimeters from ambient air is unknown, it is suggested that some of these variations are a result of the combustion products of the gas flame which was used to seal the glass enclosure.

It should also be noted that the pure helium filled dosimeters appeared to luminesce when heated but would not quench unless heated for several minutes. This was considered unsatisfactory and for that reason dosimeters having a pure helium fill gas were not further tested and do not appear on the graphs depicted in FIGS. 2, 3 and 4.

In performing the experiments, commercial dosimeters were obtained and the filled gases contained therein evacuated and substituted with either argon, nitrogen, or air plus helium at $\frac{2}{3}$ atmospheric pressure. Cold traps were used to remove as much moisture as possible from the fill gases. These dosimeters were then subject to a large number of use cycles and the data collected is represented in FIGS. 2, 3 and 4.

Depicted in FIG. 2 are the relative performances of the dosimeters tested. In this figure, dosimeters having 80% air plus helium showed an initial reading much less than a nitrogen filled dosimeter and an argon filled dosimeter. However, the particular initial intensity or reading is of little concern in assessing the rate of decline of the dosimeter with subsequent uses, so long as the reading is ascertainable and can be directly correlated to a specific exposure. Instead, the relevant factor to be considered is the rate of decline, or slope, of the average readings of the dosimeters during subsequent uses. As shown in FIG. 2, the rate of decline, or slope, of the 80% air plus helium filled dosimeter is substantially less than the nitrogen filled and argon filled dosimeter.

In order to better appreciate the significantly smaller rate of decline, reference is made to FIG. 3 where the relative sensitivity of the dosimeters was normalized at approximately 200 use cycles. In FIG. 3, it is easily seen that the 80% air plus helium filled dosimeter has a substantially smaller rate of decline than either the nitrogen filled dosimeter or the argon filled dosimeter. This is particularly evident after a large number of use cycles. It should also be noted in FIG. 3 that the performance of commercial dosimeters containing air and approximately 30% carbon dioxide is also shown. It is also noted that the decline of the argon filled dosimeter is approximately the same as that for a dosimeter filled with nitrogen. After the approximately 4,600 use cycles, the sensitivity decline of the 80% air plus helium filled dosimeter was approximately half the decline of the nitrogen filled dosimeter.

In FIG. 4, the rate of decline in sensitivity of a dosimeter filled with air and 6% helium, a dosimeter filled with air and 20% helium, and an evacuated dosimeter are shown. Again, it is not the reading which is of importance, but rather the rate of decline of the reading which indicates loss of sensitivity. As shown, the rate of decline of the evacuated unit is approximately nil while the rate of decline of the air and helium dosimeters was very slight. This would seem to indicate that an evacuated unit is best. However, a vacuum would be much more vulnerable at atmospheric leakage which would totally change the performance of the dosimeter reducing its reliability. Therefore, a fill gas is considered a necessary element of the dosimeter to provide a stable medium for reliable heat coupling between the detector and heater strip.

During the cycling of the dosimeters tested, a 16 second heating cycle was used as opposed to the more standard 20 second heating cycle. This was done to eliminate approximately 4 seconds of high temperature bakeout of the detector elements. This reduction in the time period for high temperature bakeout also was found to further reduce the rate of sensitivity decline by approximately one half of that for the 20 second heating cycle. However, all of the comparisons made herein are with dosimeters that were read out with the 16 second heating cycle.

The addition of between about 5 to 25% helium to the air used resulted in significant increase in the reuseability of a dosimeter filled with this gas. This gas admixture also had almost all of the water vapor removed therefrom. In this condition, the fill gas was relatively inert with respect to the detector element, especially when the detector element is heated to high temperatures during reading and bakeout. The beneficial effects of removing water vapor and adding between 5 and 25% helium to a nitrogen or argon gas fill is also anticipated. The use of such fill gases evidently significantly reduces surface discoloration and darkening of the detector element so that the sensitivity is maintained longer or, the rate of sensitivity decline is significantly reduced.

While the present invention has been described with respect to exemplary embodiments thereof, it will be understood by those of ordinary skill in the art that variations and modifications can be effected in these embodiments within the scope and spirit of the invention.

I claim:

1. A thermoluminescence dosimeter comprising:

a detector crystal;

a glass enclosure in which said detector crystal is located, said glass enclosure being air tight; and a fill gas contained in said glass enclosure, said fill gas being 5 to 25 mole percent helium admixed with a gas selected from the group consisting of air, nitrogen and argon, said fill gas further being substantially non-reactive with said detector crystal when said detector crystal is heated to thermoluminescence.

2. A dosimeter as claimed in claim 1 wherein said detector crystal consists essentially of calcium fluoride.

3. A dosimeter as claimed in claim 1 wherein said fill gas is air admixed with 5 to 25 mole percent helium, and the relative water vapor content of said fill gas is less than 0.30 mole percent.

4. A dosimeter as claimed in claim 1 wherein said fill gas is contained at a subatmospheric pressure.

* * * * *